United States Patent
Maggiari et al.

(10) Patent No.: US 9,935,822 B2
(45) Date of Patent: Apr. 3, 2018

(54) METHOD OF AND APPARATUS FOR CONFIGURING A LINK IN A LABEL SWITCHING COMMUNICATION NETWORK

(75) Inventors: Massimiliano Maggiari, Genoa (IT); Michela Bevilacqua, Genoa (IT); Carla Marcenaro, Genoa (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 92 days.

(21) Appl. No.: 14/403,992

(22) PCT Filed: May 25, 2012

(86) PCT No.: PCT/EP2012/059875
§ 371 (c)(1),
(2), (4) Date: Nov. 25, 2014

(87) PCT Pub. No.: WO2013/174445
PCT Pub. Date: Nov. 28, 2013

(65) Prior Publication Data
US 2015/0163094 A1    Jun. 11, 2015

(51) Int. Cl.
*H04L 12/24*    (2006.01)
*H04L 12/723*    (2013.01)
*H04L 12/751*    (2013.01)

(52) U.S. Cl.
CPC ...... *H04L 41/0803* (2013.01); *H04L 41/0816* (2013.01); *H04L 41/0853* (2013.01);
(Continued)

(58) Field of Classification Search
CPC ............. H04L 41/0803; H04L 41/0816; H04L 41/0853; H04L 41/12; H04L 45/02; H04L 45/50
(Continued)

(56) References Cited

U.S. PATENT DOCUMENTS

2003/0208622 A1* 11/2003 Mosier ................. H04L 41/022
709/244
2005/0180335 A1    8/2005 Lee
(Continued)

FOREIGN PATENT DOCUMENTS

CN    1747432 A    3/2006
CN    1889470 A    1/2007
(Continued)

OTHER PUBLICATIONS

PCT International Search Report, Application No. PCT/EP2012/059875, dated Feb. 18, 2013; 4pgs.
PCT Written Opinion of the International Searching Authority Application No. PCT/EP2012/059875, dated Feb. 18, 2013; 6pgs.
Lang, J. et al., Network Working Group, RFC 4204; 'Link Mangement Protocol (LMP),' Copyright The Internet Society (2005); Oct 1, 2005; 86pgs.
(Continued)

*Primary Examiner* — Andrew Chriss
*Assistant Examiner* — Ellen Kirillova
(74) *Attorney, Agent, or Firm* — Nicholson De Vos Webster & Elliott, LLP (57) ABSTRACT

The present invention relates to a method of and apparatus for configuring a link in a label switching communication network. The method implemented in a network node comprises determining formation of a communication link between the network node and another network node and sending link formation information to a link manager. The method further comprises receiving link configuration information for the communication link from the link manager and configuring the communication link in response to the received link configuration information.

14 Claims, 4 Drawing Sheets

(52) U.S. Cl.
CPC .............. *H04L 41/12* (2013.01); *H04L 45/02* (2013.01); *H04L 45/50* (2013.01)

(58) Field of Classification Search
USPC ........................................................ 370/254
See application file for complete search history.

(56) References Cited

U.S. PATENT DOCUMENTS

| | | | | |
|---|---|---|---|---|
| 2007/0019540 | A1* | 1/2007 | Biswas | H04L 29/12094 370/217 |
| 2008/0267175 | A1* | 10/2008 | Mo | H04L 45/02 370/357 |
| 2010/0035546 | A1* | 2/2010 | Simons | G01S 5/0289 455/41.2 |
| 2010/0202772 | A1 | 8/2010 | Wei et al. | |
| 2011/0050437 | A1* | 3/2011 | O'Neill | H04M 1/04 340/644 |

FOREIGN PATENT DOCUMENTS

| | | | | |
|---|---|---|---|---|
| CN | 101588288 A | 11/2009 | | |
| CN | 101394677 | 10/2012 | | |
| EP | 1026916 A2 | * 8/2000 | ............. | H04L 41/12 |
| EP | 2259510 A1 | * 12/2010 | ............. | H04L 45/00 |
| WO | 2004088918 A3 | 4/2005 | | |
| WO | WO 2012/000534 | 1/2012 | | |

OTHER PUBLICATIONS

"International Preliminary Report on Patentability," Application No. PCT/EP2012/059875, dated Nov. 25, 2014, 8 pages.

Office Action from foreign counterpart China Patent Application No. 201280074877.4, dated Nov. 3, 2016, 28 pages.

Office Action from foreign counterpart China Patent Application No. 201280074877.4, dated Oct. 26, 2017, with English translation, 14 pages.

* cited by examiner

METHOD OF AND APPARATUS FOR CONFIGURING A LINK IN A LABEL SWITCHING COMMUNICATION NETWORK

CROSS-REFERENCE TO RELATED APPLICATIONS

This application is a National stage of International Application No. PCT/EP2012/059875, filed May 25, 2012, which is hereby incorporated by reference.

TECHNICAL FIELD

The present invention relates to a method of and apparatus for configuring a link in a label switching communication network. In particular, in one embodiment the invention relates to a method of and apparatus for configuring a link in a General Multi Protocol Label Switching (GMPLS) network.

BACKGROUND

General Multi Protocol Label Switching (GMPLS) is today employed in Synchronous Digital Hierarchy (SDH) networks, Optical Transport Networks (OTN) and Wave Division Multiplexing (WDM) networks. In the medium term, General Multi Protocol Label Switching (GMPLS) may enable Ethernet control plane based networks to be generalised by unifying Multi Protocol Label Switching (MPLS) and Multi Protocol Label Switching Transport protocol (MPLS-TP) networks.

Recently, development of General Multi Protocol Label Switching (GMPLS) network protocols has reached a level of maturity with regard to the protocol stack and the related control plane deployment. However, in the management plane, further work is required on the network monitoring functionality to ensure that the network responds in an appropriate and timely manner to changing network conditions.

The Link Management Protocol (LMP), deployed in a General Multi Protocol Label Switching (GMPLS) network, is used to manage neighbouring network nodes. The Link management protocol uses the neighbouring node link information and it is used for both service provisioning and topology management. However, since the Link Management Protocol (LMP) implemented on any one network node does not have a full network view, the Link Management Protocol (LMP) implemented in the network nodes must be configured from a centralised system. In some General Multi Protocol Label Switching (GMPLS) networks, the centralised system might be a Network Management system (NMS).

Traditionally, network management systems manage the network topology and the related Link Management Protocol (LMP) configuration by means of manual node installation, manual link creation and then configuration of the Link Management Protocol (LMP) for each network node of the manually setup link. This is a tedious and error prone approach.

The present invention seeks to alleviate at least some of the problems in the prior art, and to provide a new method of and apparatus for configuring a link in a label switching communication network.

SUMMARY

In accordance with one aspect of the invention, there is provided a method of configuring a link in a label switching communication network. The first step of the method at a network node is determining the formation of a communication link between the network node and another network node. The second step of the method comprises the step of sending link formation information to a link manager in response to a positive determination of formation of a communication link. The third step of the method comprises receiving link configuration information for the communication link from the link manager. The fourth step of the method comprises configuring the communication link in response to the received link configuration information.

In some embodiments, the step of determining the formation of a communication link comprises a first step of detecting initiation of a communication link at a first endpoint at the network node. In a second step, a link initiation message is sent requesting second endpoint identity information on the initiated communication link. In a third step second endpoint identity information is received.

In some embodiments the step of determining at a network node, the formation of a communication link between the network node and another network node comprises the step of detecting the insertion of a cable at a port of the network node.

In some embodiments the message requesting second endpoint identity information on the initiated communication link includes first endpoint identity information.

In some embodiments the endpoint identity information comprises the unique identification information of the network node and Shelf Card Port identity information.

In some embodiments the step of sending link formation information to a link manager comprises the step of sending endpoint identity information for the first and second endpoint of the communication link to the link manager.

In some embodiments the step of configuring the communication link comprises the step of configuring local link configuration records for the newly formed communication link in response to the received link configuration information.

In accordance with one aspect of the invention, there is provided a method of configuring a link in a communication network. In a first step link formation information relating to a new communication link is received from a network node. In a second step, a link record for the communication link is created in response to the reception of communication link formation information from the network node. In a third step, the communication link is configured. In a fourth step, link configuration information is sent to network nodes associated with the communication link. This method might be carried out in some embodiments in a network management system of a label switching network.

In some embodiments, it is determined whether the network nodes associated with the new communication link are installed. If a network node is not installed, the method includes the step of installing the network node.

In accordance with one aspect of the invention there is provided a method of configuring a link in a communication network. The first step of the method at a network node is determining the formation of a communication link between the network node and another network node. The second step of the method comprises the step of sending link formation information to a link manager in response to a positive determination of formation of a communication link. In a third step link formation information relating to a new communication link is received from a network node. In a fourth step, a link record for the communication link is created in response to the reception of communication link formation information from the network node. In a fifth step, the communication link is configured. In a fourth step, link configuration information is sent to network nodes associated with the communication link. The sixth step of the method comprises receiving link configuration information for the communication link from the link manager. The seventh step of the method comprises configuring the communication link in response to the received link configuration information.

In accordance with one aspect of the invention there is provided an apparatus for a network node of a communication network, for configuring a link in the communication network. The apparatus comprises a link configuration element arranged to communicate with corresponding link configuration elements in other network nodes of the communication network, and arranged to communicate with a network management system of the communication network. The apparatus also has a store coupled to the link configuration element for storing configuration information. In operation the link configuration element is operable to communicate with another link configuration element to determine the formation of a communication link between ports of the respective network nodes. The link configuration element is also operable to communicate with the network management system to inform the link manager of the formation of the communication link. The link configuration manager is also operable to receive link configuration information from the network management system and to configure information for the communication link in the store.

In accordance with one aspect of the invention there is provided an apparatus for a network management system of a communication network, for configuring a link in the communication network. The apparatus comprises a link configuration element, arranged to communicate with link configuration elements in network nodes of the communication network. The apparatus also comprises a store, coupled to the link configuration element, for storing information relating to a communication link. In operation the link configuration element is operable to receive link formation information relating to a communication link from a link configuration element in a network node. The link configuration element is operable to create a link record for the communication link in response to the reception of communication link formation information from the network node. The link configuration element is operable to configure the communication link and to send link configuration information to network nodes associated with the communication link.

In some embodiments, a label switched communication network comprises a network management system having an apparatus in accordance with an embodiment of the invention and at least one network node having an apparatus in accordance with another embodiment of the invention.

BRIEF DESCRIPTION OF THE DRAWINGS

The invention will now be described, by way of example, with reference to the accompanying drawings, in which.

DETAILED DESCRIPTION

Embodiments of the invention will now be described with reference to the accompanying drawings.

Figure 1:
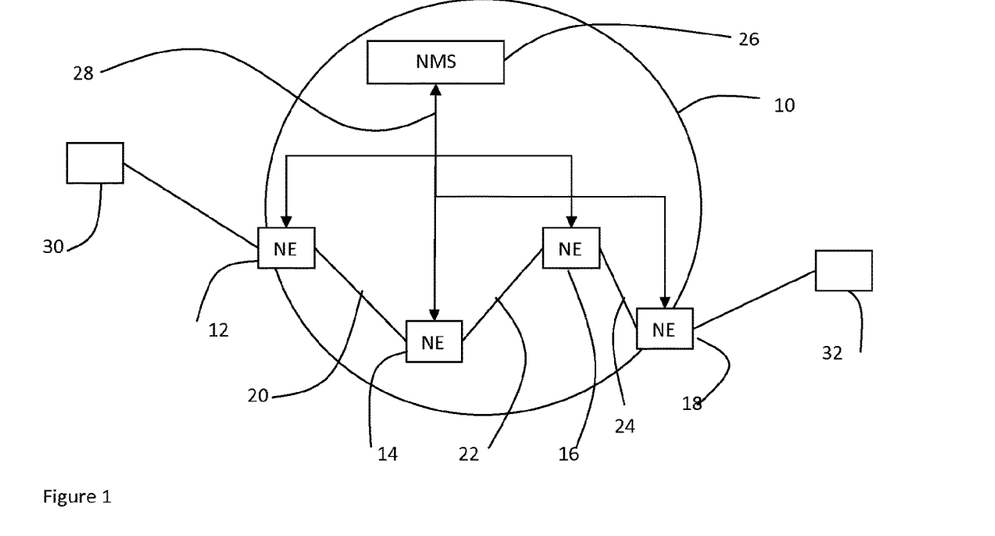
FIG. 1 is a schematic diagram showing an exemplary communication network.

FIG. 1 is a schematic diagram showing a communication network 10 in which embodiments of the invention may be implemented. In this exemplary embodiment, the communication network is a General Multi Protocol Label Switching (GMPLS) network.

Four exemplary network nodes 12, 14, 16, 18 are shown in the communication network 10 for illustrative purposes, although clearly in an actual communication network there are typically many more network nodes.

The exemplary network nodes 12, 14, 16, 18 are coupled together in the data plane by respective data plane connections 20, 22, 24. These data plane connections may be made using a variety of different underlying data transport protocols in different communication networks. In particular in different exemplary embodiments the data plane connections may be made using Synchronous Digital Hierarchy (SDH), Optical Transport Network (OTN), Wave Division Multiplexing (WDM) or other similar technologies.

The communication network 10 is also provided with a Network Management System NMS 26, which operates to manage many aspects of the network operation, as will be understood by a skilled person. The network management system NMS 26 is coupled in the control plane, shown generally by the reference 28, to the network elements 12, 14, 16, 18 of the communication network 10. In addition, each of the network elements 12, 14, 16, 18 are coupled in the control plane 28 to at least one neighbouring network element.

In a communication network such as the communication network 10, some of the network nodes are coupled to external nodes that are outside the network. For example in FIG. 1, two external nodes 30 and 32 outside the communication network 10 are shown. External node 30 is coupled to the network node 12, and external node 32 is coupled to network node 18 in the exemplary communication network 10. Further, some network nodes are connected only to other network nodes within the communication network 10, such as network nodes 14 and 16.

As indicated above, the exemplary communication network 10 is a General Multi Protocol Label Switching (GMPLS) network. The network nodes 12 and 18 that are coupled to nodes outside the label switched network 10 are operable as label edge routers. The network nodes 14 and 16 that are connected only to other network nodes within communication network 10 are operable as label switching routers.

As will be appreciated by a skilled person, in the exemplary label switched communication network 10 shown in FIG. 1, a label edge router, for example network node 12, may receive data for onward transmission within the communication network 10 from an external node, for example external node 30.

In order to transport the data within the label switching network 10, the network node 12 applies a label to the data and sends it within the network 10, for example on the data plane link 20 to the network node 14. The network node 14 removes the label from the data it has received from the network element 12 and applies a label to the data for onwards transmission, for example on the data plane link 22 to the network node 16. The network node 16 removes the label from the data it has received from the network element 14 and applies a label to the data for onwards transmission, for example on the data plane link 24 to the network node 16. The network node 18 removes the label from the data it has received from the network element 16 and then forwards the data to the external node 32 using a suitable transmission protocol, as will be appreciated by a skilled person.

The invention concerns the management of the links between network elements in the network in response to changes in the topology of the network over time.

Figure 2:
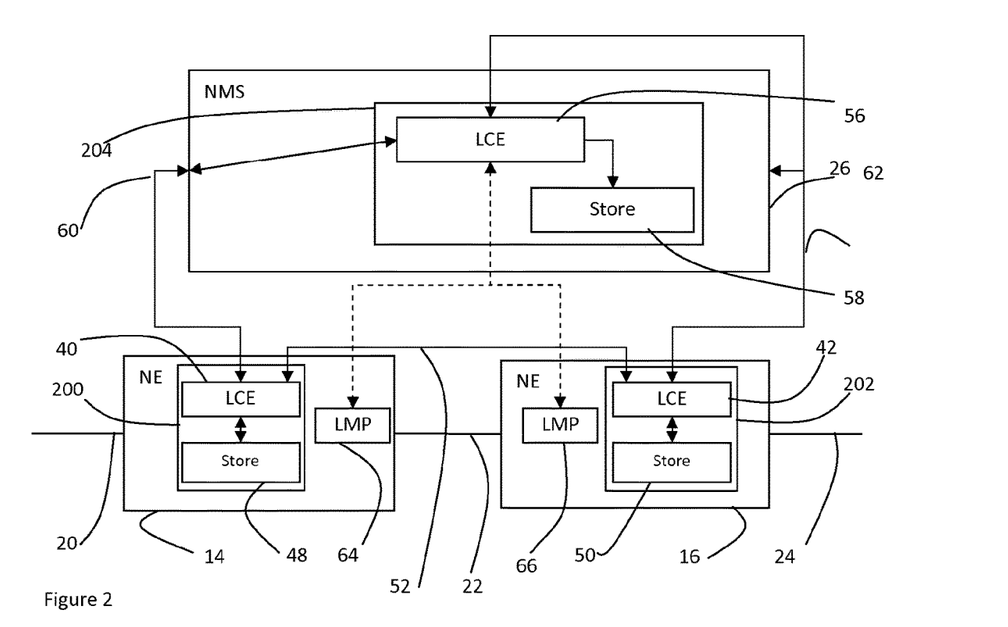
FIG. 2 is a more detailed schematic diagram of part of the communication network shown in FIG. 1.

FIG. 2 is a more detailed schematic diagram of part of the communication network.

FIG. 2 shows in more detail network nodes 14 and 16 and the network management system 26 together with the connections between them. Elements in FIG. 2 that correspond to the same or similar elements in FIG. 1 have been given the same reference numbers.

As shown in FIG. 2, the network node 14 and the network node 16 are each provided with a respective apparatus, 200, 202 for configuring a link in the communication network each comprising a respective link configuration element (LCE) 40, 42 and a respective store 48, 50, for storing link configuration information.

In one embodiment the apparatus 200, 202 is a card installed in a rack of the network node 14, 16. In alternative embodiments the apparatus 200, 202 can be integrated with other hardware elements of the network node 14, 16.

The respective link configuration element (LCE) 40, 42 of the network node 14 and the network node 16 are coupled by a connection 52 that provides a control plane connection between the link configuration element (LCE) 40 and the link configuration element (LCE) 42. This control plane connection provides a path for signalling and information exchange between the respective link configuration elements (LCE) 40,42. In different embodiments the control plane connection may be provided by an in-band channel or by an out-of-band channel, as will be appreciated by a skilled person.

The network management system 26 is provided with an apparatus 204 comprising a link configuration element (LCE) 56 and a respective store 58 for storing link configuration information. The link configuration element (LCE) 56 acts as part of the link manager in the network management system (NMS) 26 for the links between network nodes in the communication network. The link configuration element (LCE) 56 in the network management system (NMS) 26 is coupled to the link configuration element (LCE) 40 in network node 14 by control plane connection 60 and to the link configuration element (LCE) 42 in network node 16 by control plane connection 62.

In one embodiment the apparatus 204 is a card installed in a rack of the NMS 26. In alternative embodiments the apparatus 204 can be integrated with other hardware elements of the NMS 26.

The link configuration elements 40, 42, 56 described above implement the method in accordance with the exemplary embodiment described below. Typically, the link configuration elements 40, 42, 56 may be implemented as software as part of the network node and network management system respectively.

In the exemplary embodiment, the network nodes 14, 16 are provided with respective Link Management Protocol elements 64, 66. In the exemplary embodiment shown in FIG. 2, the Link Management Protocol is a distributed protocol that is implemented in the Link Management Protocol elements 64, 66 as will be understood by a skilled person. The operation of the Link Management protocol in a General Multi Protocol Label Switching (GMPLS) network will not be discussed in more detail as it will be understood by a skilled person.

In the exemplary embodiment shown in FIG. 2, the link configuration element (LCE) 56 in the network management system (NMS) 26 acts to configure the links between the nodes and is coupled to the LMP elements 64, 66 to communicate the link configuration to the LMP elements 64, 66. However, in different embodiments the functionality may be provided within the Network Management System (NMS) 26 as separate or as combined elements or distributed in a different fashion from that shown in FIG. 2 at the discretion of a skilled person. In some embodiments a LMP manager element may be provided separately from the link configuration element LCE 56 within the network management system (NMS).

Figure 3:
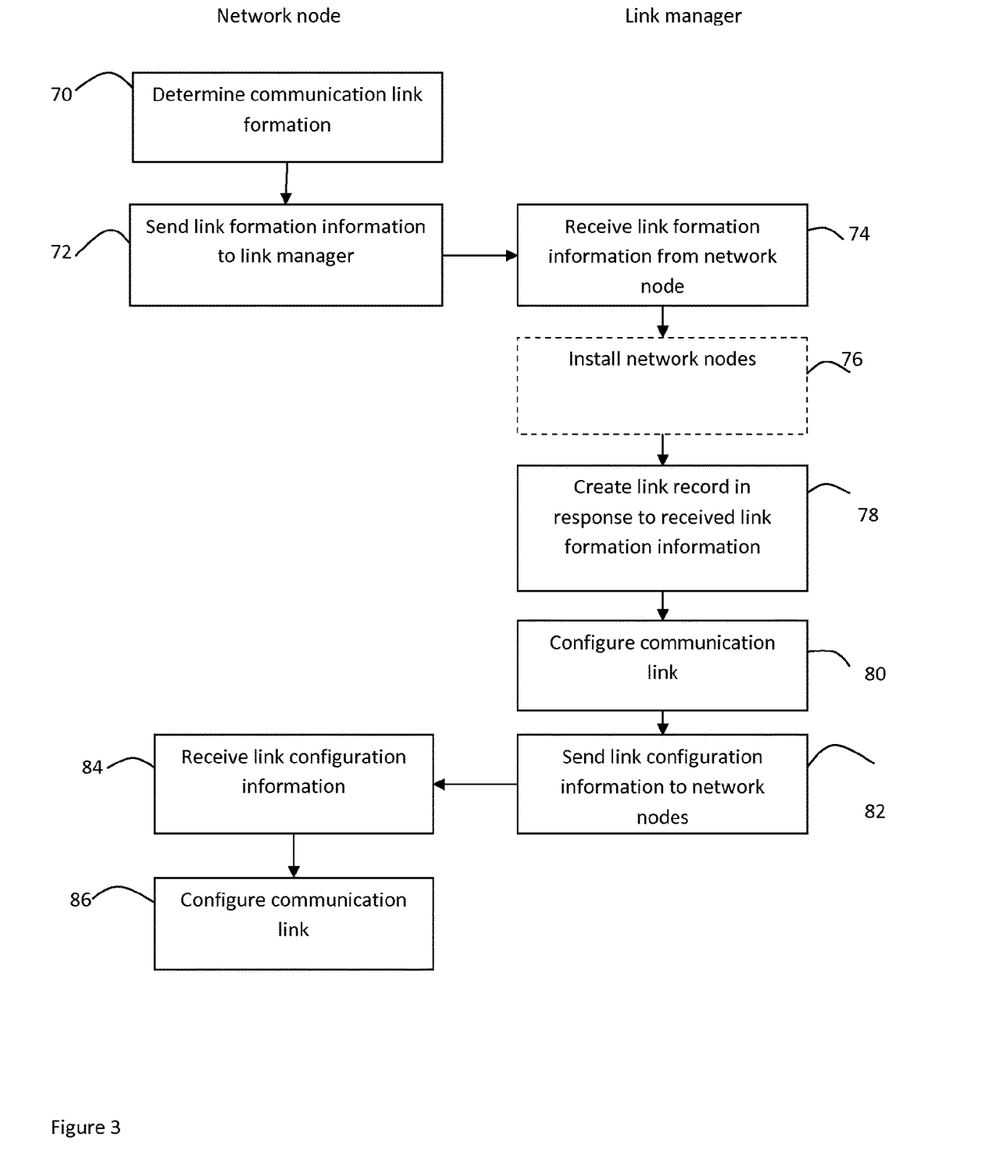
FIG. 3 is a flow chart showing steps of a method in accordance with an embodiment.

FIG. 3 is a flow chart showing steps of methods implemented in the network nodes and a network manager of the communication network in accordance with embodiments of the invention.

Typically, in embodiments of the invention the steps shown as implemented by the network node may be implemented by the link configuration elements (LCE) 40, 42 of the network nodes 14, 16 shown in FIG. 2. Typically, in embodiments of the invention the steps shown as being implemented by the link manager may be implemented by the link configuration element (LCE) 56 shown in FIG. 2.

In a first step 70, a network node determines the formation of a communication link with another network node. In the exemplary embodiment shown in FIG. 2, this step is carried out by link configuration element 40 in a network node 14 or by link configuration element 42 in a network node 16. As will be apparent to a skilled person, it is possible to achieve this method step using a variety of different techniques in different embodiments, some of which will be explained in more detail in the following description.

Once the network node has determined the formation of the communication link in step 70, link formation information relating to the newly formed link is sent from the network node to a link manager in step 72. In the exemplary embodiment shown in FIG. 2, this step is carried out by link configuration element 40 in a network node 14 or by link configuration element 42 in a network node 16.

The link formation information relating to the newly formed link is received by the link manager in step 74. In the exemplary embodiment shown in FIG. 2, this step is carried out by link configuration element 56 of the network management system (NMS) 26.

The communication of the link formation information relating to the newly formed link in steps 72 and 74 may be achieved in different ways in different embodiments of the invention. In the exemplary embodiment the communication is achieved by sending messages on an in-band communication channel between respective link configuration elements 40, 42 in the network node and the link configuration element 56 of the network management system (NMS) 26 acting as link manager.

In response to the link formation information received from the network node in step 74, the link manager of the Network Management System 26, performs steps necessary to configure the newly formed link in the link manager records. Again, this step is carried out by link configuration element 56 of the Network Management System 26 in the exemplary embodiment shown in FIG. 2.

In some situations the network nodes involved in the newly formed link may not be installed in the existing link manager records. Therefore, if necessary, in step 76 the link manager of the Network management system first installs one or both of the network nodes. Since this step may not be needed in all embodiments or in all operations of embodiments of the invention, step 76 of FIG. 3 is shown in dashed lines. In the exemplary embodiment shown in FIG. 2, network node records may be created in the network management system link manager store 58 by the link configuration element (LCE) 56.

A link record corresponding with the newly formed link is created in the records of the link manager in step 78. Typically, the link record will identify the end points of the link as notified in the received link formation information. In the exemplary embodiment shown in FIG. 2, a link record is created in the network management system link manager store 58 by the link configuration element (LCE) 56.

Once the link record had been created in step 78, the communication link is configured and the configuration recorded in the link record in step 80. Once again, in the exemplary embodiment shown in FIG. 2, the communication link is configured by the link configuration element (LCE) 56 of the network management system, and the link configuration is stored in the link record that was previously created in the network management system link manager store 58 by the link configuration element (LCE) 56 in step 78.

In step 82, link configuration information is sent to the network nodes associated with the link. In the exemplary embodiment shown in FIG. 2, the link configuration information is communicated to the network nodes by the link configuration element 56 using the link management protocol. Thus, link configuration element (LCE) 56 distributes the required link configuration information to the relevant link management protocol elements 64, 66 in the respective network nodes 14, 16.

In step 84, the link configuration for the newly formed link is received at each of the network nodes associated with the link.

In step 86, the network nodes configure the communication link in response to the link configuration information received from the link manager in step 84. As discussed above, in the exemplary embodiment described above with reference to FIG. 2 this step is achieved by the link management protocol elements 64, 66 of the network nodes 14, 16 receiving link configuration information from the link configuration element 56, and using the received configuration information to configure the link. This may be achieved in some embodiments, for example, by creating or updating the configuration information relating to the link in a link record in the respective store 48, 50.

A more detailed explanation of a method of carrying out steps 70 and 72 described above with reference to FIG. 3 in accordance with an exemplary embodiment will now be explained with reference to FIG. 4

As will be known by a skilled person, every network node in a communication network can be uniquely identified, for example from the Internet Protocol (IP) address of the Ethernet interface assigned from a Dynamic Host Configuration Protocol (DHCP) or assigned manually by the operator at commissioning time or from the Network Service Access Point (NSAP) address. In addition, ports of each network node can also be uniquely identified since the Unique ID (at Node Scope) of each port is known to the network node.

Figure 4:
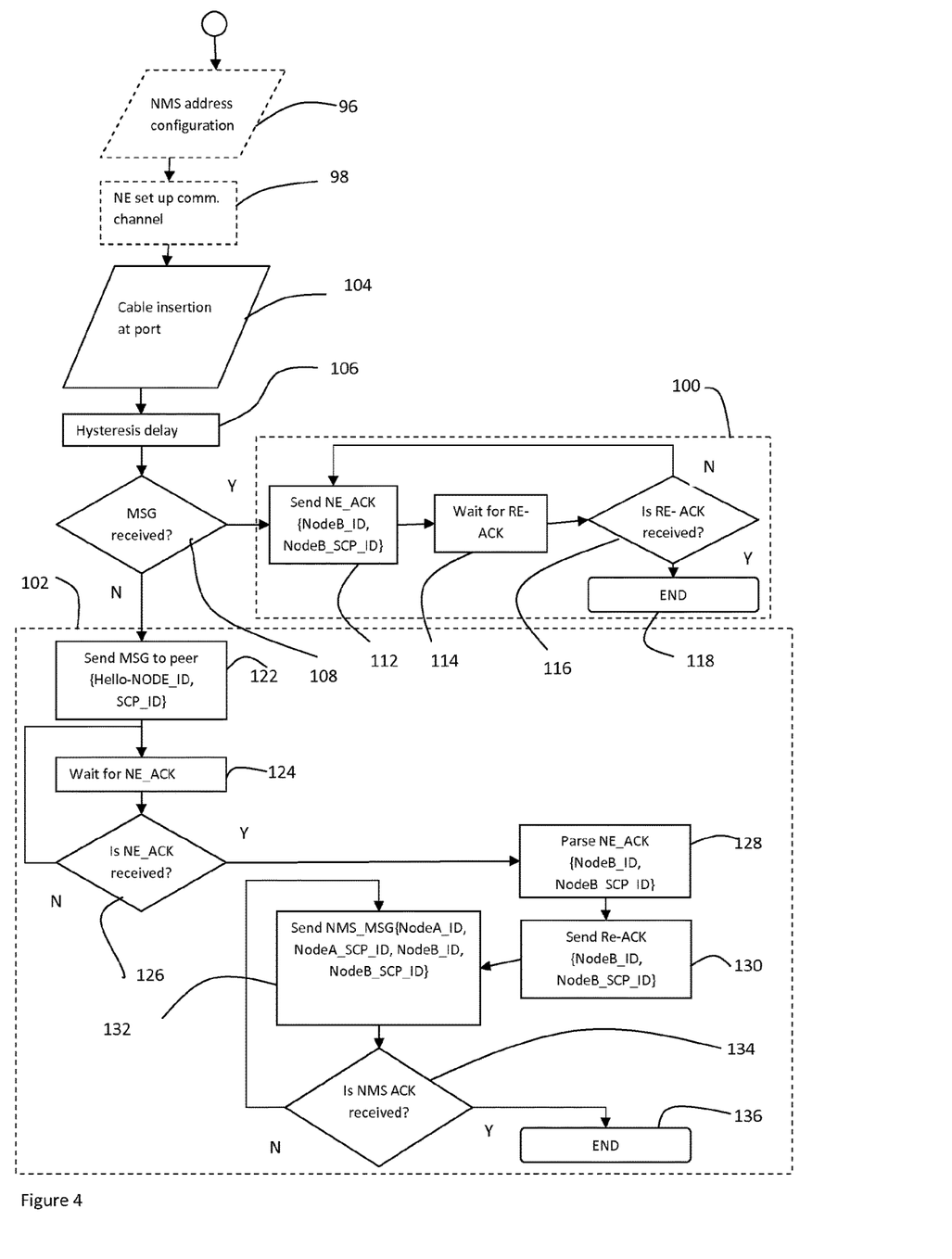
FIG. 4 is a flow chart showing steps of a method carried out by a network node in accordance with an embodiment.

In the exemplary embodiment shown in FIG. 4, in a first step 96 the Network Management System (NMS) configures the network node address. In a second step 98, a network node control channel is set up between the network node and the network management system (NMS). These steps 96, 98 are needed in embodiments in which the network node is newly commissioned on the communication network. However, steps 96 and 98 are not necessary in embodiments in which the network node has already been commissioned on the communication network, and steps 96 and 98 of the exemplary method shown in FIG. 4 have therefore been shown in dashed lines.

When a new communication link is formed between two network nodes, typically a cable is inserted into a free port of one network node and into a free port of another network node. In the exemplary embodiment, it is assumed that a new communication link between network nodes 14 and network node 16 is formed first by inserting a cable into a free port of network node 14 and then into a free port of network node 16.

In the exemplary embodiment, one network node assumes an active node role, and one network node assumes a passive network node role. In the exemplary embodiment, passive network node role steps are taken by the network node into which a cable is inserted second, and are shown in box 100 of FIG. 4. In the exemplary embodiment, active network node role steps are typically taken by the network node into which a cable is inserted first and are shown in box 102 of FIG. 4.

A cable insertion into a port of a network node is detected by the network node in step 104. In the exemplary embodiment shown in FIG. 2, this step is carried out by the link configuration element 40 in the case of the network node 14 and by link configuration element 42 in the case of network node 16.

Since the detected cable insertion may be at the first or the second end of the new communication link, in the exemplary embodiment the network node must determine whether it is at the first or the second end of the communication link, and therefore whether the network node should assume an active role or a passive role.

Thus in step 106 the network node waits for a period of time determined by a hysteresis delay. After the hysteresis delay in step 106, the network node determines whether a link initiation/hello message has been received at the port into which the cable has been inserted in step 108. In the exemplary embodiment shown in FIG. 2, this step is carried out by the link configuration element 40 in the case of the network node 14 and by link configuration element 42 in the case of network node 16.

If a link initiation/hello message is received, step 108-*y*, in the exemplary embodiment the network node assumes the passive network node role for formation of the new communication link, and the network node follows the steps set out in box 100, as will be explained in the following description.

If a link initiation/hello message is not received, step 108-*n*, in the exemplary embodiment the network node assumes the active network node role for formation of the new communication link, and the network node follows the steps set out in box 102, as will be explained in the following description.

As will be apparent to a skilled person, therefore, the hysteresis delay in step 106 enables the network nodes at either end of the communication link to determine which of them is to have an active role (hereafter the active network node) and which of them is to have a passive role (hereafter the passive network node) in the exemplary communication link formation notification process. In different embodiments the allocation of active and passive roles may be determined differently, for example in some embodiments the second network node may be the active network node, or both may assume an active role, or the network node having an active role may be determined by a network hierarchy or other method not based on detection of a cable insertion.

The steps taken by the network node performing a passive role in the exemplary embodiment will now be described with reference to box 100. In the exemplary embodiment shown in FIG. 2, these steps are carried out by the link configuration elements 42 in the network node 16.

The link initiation/hello message that is received in step 108 may contain identity information specifying the end point of the communication link at the active network node, in some embodiments. In the exemplary embodiment the link configuration element 42 of the passive network node 16 receives the link initiation/hello message from the link configuration element 40 of active network node 14, the link initiation/hello message containing identity information specifying the end point of the communication link at the active network node 14.

In the exemplary embodiment, the end point identity information comprises the unique identification information of the active network node 14 (NodeA_ID) and information identifying the network node port, for example by providing Shelf Card Port identity information (NodeA_SCP_ID).

Alternatively, in some embodiments, the message sent from the active network node 14 to the passive network node 16, and received by the passive network node in step 108 may be merely a request for end point identity information from the passive network node, and may not contain any end point identity information for the active network node.

In response to the receipt of the link initiation/hello message from the active network node, step 108-$y$, in the exemplary embodiment the link configuration element 42 of the passive network node 16 returns an acknowledgement message, NE_ACK, back to the link configuration element 40 of the active network node 14 in step 112. The acknowledgement message, NE_ACK, contains end point identity information specifying the end point of the communication link at the passive network node. In the exemplary embodiment, the end point identity information comprises the unique identification information of the passive network node (NodeB_ID) and information identifying the port, for example the Shelf Card Port identity information (NodeB_SCP_ID).

In embodiments in which the message received from the active network node includes end point identity information, the acknowledgement message, NE_ACK, may also contain the active node end point identity information as well as the passive node end point identity information.

Once the link configuration element 42 of the passive network node 16 has sent the acknowledgement message NE_ACK back to the link configuration element 40 of the active network node 14 in step 112 of FIG. 2, in step 114 the link configuration element 42 of the passive network node 16 waits to receive a re-acknowledgement message RE_ACK from the link configuration element 40 of the active network node 14.

If the re-acknowledgement message RE_ACK is not received after a suitable wait time, step 116-$n$, the link configuration element 42 of the passive network node 16 returns to step 112 and re-sends the acknowledgement message NE_ACK back to the active network node 14. If the re-acknowledgement message RE_ACK is received, step 116-$y$, the activity of link configuration element 42 of the passive network node 16 ends in step 118.

It should be noted that, although not shown in FIG. 4, after the network management system (NMS) has configured the communication link, the passive network node will receive link configuration information from the network management system (NMS), as described above with reference to steps 84 and 86 of FIG. 3.

The steps taken by the network node performing the active role in the exemplary embodiment will now be described with reference to box 102. If no incoming message has been received in step 108-$n$, it is likely that the network node is the first to have the cable inserted into its port, and that the network node is therefore to play an active role described with reference to the steps in box 102. In the exemplary embodiment shown with respect to FIG. 2, these steps are carried out by the link configuration element 40 in the network node 14.

Therefore, in the exemplary embodiment the link configuration element 40 of the network node 14 sends a link initiation/hello message MSG on the newly forming communication link in step 122. The link initiation/hello message MSG from the link configuration element 40 of the network node 14 that is sent in step 122 may contain identity information specifying the end point of the communication link at the active network node 14 in some embodiments.

As discussed above, in the exemplary embodiment, the end point identity information comprises the unique identification information of the active network node 14 (NodeA_ID) and information identifying the port, for example by providing Shelf Card Port identity information (NodeA_SCP_ID). Alternatively, in some embodiments, the message sent from the active network node in step 122 may be merely a request for end point identity information from the passive network node, and would not contain any end point identity information for the active network node.

Thereafter in step 124 the link configuration element 40 of the network node 14 waits for an acknowledgement message NE_ACK from the passive network node. The sending of the acknowledgement message NE_ACK from the passive network node to the active network node in the exemplary embodiment has been described above with reference to step 112 of FIG. 4.

If the acknowledgement message NE_ACK is not received, step 126-$n$, the link configuration element 40 of the network node 14 continues to wait for an acknowledgement message NE_ACK from the passive network node 16. In some embodiments, it may be appropriate to return to step 122 in order to resend the link initiation/hello message MSG if the reception of an acknowledgement message NE_ACK is not determined in step 126.

Once an acknowledgement message NE_ACK is received, in step 126-$y$, the link configuration element 40 of the network node 14 parses the received acknowledgement message NE_ACK in step 128 to obtain end point identity information for the passive network node, comprising the unique identification information of the passive network node (NodeB_ID) and information identifying the port, for example by providing Shelf Card Port identity information (NodeB_SCP_ID).

In step 130, in the exemplary embodiment, the link configuration element 40 of the network node 14 sends a re-acknowledgement message RE_ACK message to the passive network node 16. In the exemplary embodiment the RE_ACK message contains the end point identity information for the passive network node 16, comprising the unique identification information of the passive network node (NodeB_ID) and information identifying the port, for example by providing Shelf Card Port identity information (NodeB_SCP_ID).

The active network node now has the end point identity information of the passive network node for the newly formed connection. The active network node can therefore inform the network management system (NMS) 26 of the formation of the new connection in step 132.

In the exemplary embodiment, the link configuration element 40 of the network node 14 sends a link formation notification message NMS_MSG containing end point identity information for the active network node 14 and for the passive network node 16 to the link configuration element 56 of the network management system 26. A unique IP/NSAP address is assigned by the network operator to the network management system 26 during network commissioning in order to be able to send such notification messages to the network management system 26.

In step 134 the active network node determines whether an NMS acknowledgement message NMS_ACK has been received from the network management system (NMS) 26. In the exemplary embodiment shown in FIG. 2, the link configuration element 40 of the network node 14 receives an acknowledgement message from the link configuration element 56 of the network management system 26. If the acknowledgement message NMS_ACK has not been received, step 134-n, in the exemplary embodiment the notification message NMS is sent again in step 132. If the acknowledgement message NMS_ACK has been received, step 134-y, the activity of the active network node ends in step 136.

It should be noted that, although not shown in FIG. 4, after the network management system (NMS) has configured the communication link, the active network node will receive link configuration information from the network management system (NMS), as described above with reference to steps 84 and 86 of FIG. 3.

In this exemplary embodiment, the Link Management Protocol elements 64, 66 in the network nodes shown in FIG. 2 are responsible for configuring the new communication link using the Link Management Protocol once the link configuration has been carried out by the link configuration element 56 of the network management system (NMS) 26.

The operation of the Network management system (NMS) 26 in response to the receipt of the link formation information will now be described with reference to FIG. 5. In the exemplary embodiment, this method is carried out by the link configuration element 56 of the network management system (NMS) 26.

First, a link formation notification message NMS_MSG that has been sent by a network node in step 132 is received at the link configuration element 56 of the network management system (NMS) 26. As discussed above, in the exemplary embodiment, the link formation notification message NMS_MSG contains the link end point identity information for the two end points of the newly formed communication link, in this case the NodeA_ID and NodeA_SCP_ID identifying the end point at the active network node, and NodeB_ID and NodeB_SCP_ID identifying the end point at the passive network node.

The link configuration element 56 of the network management system (NMS) 26 processes the link formation notification message NMS_MSG in step 150 in order to identify the link end point identity information for the two end points of the newly formed communication link.

In step 152, link configuration element 56 of the network management system (NMS) 26 sends an acknowledgement message NMS_ACK MSG back to the network node from which the NMS_MSG was received, i.e. the active network node of the communication link.

In some embodiments such as the exemplary embodiments, the acknowledgement message NMS_ACK contains the link end point identity information for the two end points of the newly formed communication link, in this case the NodeA_ID and NodeA_SCP_ID identifying the end point at the active network node, and NodeB_ID and NodeB_SCP_ID identifying the end point at the passive network node. The acknowledgement message NMS_ACK is then received by the active network node in step 134 shown in FIG. 4 as will be understood by a skilled person. Although in some embodiments the acknowledgement message NMS_ACK may not contain the link end point identity information for the two end points of the newly formed communication link, the inclusion of this information may assist in ensuring the robustness and reliability of the messaging protocol.

In this way both the adjacency relationship between the network nodes and the link connectivity of the newly formed link are made known to the link configuration element 56 of the network management system (NMS) 26 without any operator involvement. The link configuration element 56 of the network management system (NMS) 26 is able to use the information regarding the newly created communication link, which has been provided to the link configuration element 56 of the network management system (NMS) 26 by the link configuration element 40 of the active network node 14, in order to update the topology of the communication network and also to automatically configure the communication link.

Figure 5:
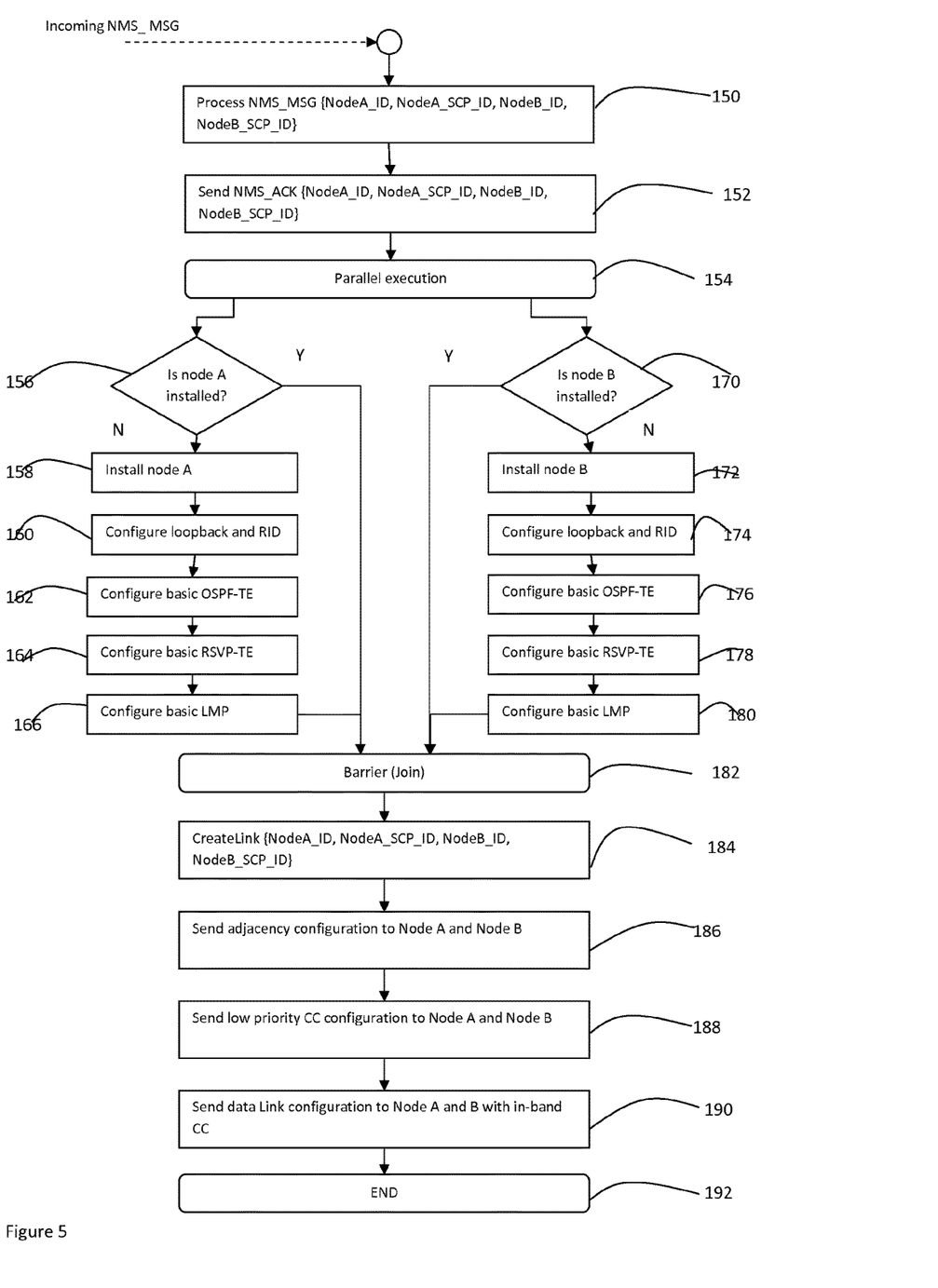
FIG. 5 is a flow chart showing steps of a method carried out by a network management system in accordance with an embodiment.

Thus, in step 154 of the exemplary embodiment as shown in FIG. 5, the link configuration element 56 of the network management system (NMS) 26 commences parallel execution to update the topology of the network in the network management system (NMS) records, if necessary, in response to the received link end point identity information for the two end points of the newly formed communication link.

Thus, firstly taking node A, for example the active network node 14 in the exemplary embodiment shown in FIG. 2, in step 156 the link configuration element 56 of the network management system (NMS) 26 determines whether the node is installed in the network management system records stored in store 58 in the exemplary embodiment shown in FIG. 2.

If the node is not installed, step 156-n, in step 158 the link configuration element 56 of the network management system (NMS) 26 installs the node A in the network management system records stored in store 58 in the exemplary embodiment shown in FIG. 2.

Thereafter, the link configuration element 56 of the network management system (NMS) 26 configures the network node A by carrying out the following steps in the exemplary embodiment:
- in step 160: configuring the loopback interface and the router identity (RID) for network node A;
- in step 162: configuring the basic Open Path Shortest First-Traffic Extension (OPSF-TE) protocol for network node A;
- in step 164: configuring the basic Resource Reservation Protocol: Traffic extension (RSVP-TE) protocol for network A; and in step 166: performing a basic Link Management Protocol (LMP) configuration for the network node A.

The steps necessary to perform a Link Management Protocol (LMP) configuration in step 166 are well known to a skilled person, and therefore will not be explained in great detail. In some embodiments step 166 may include configuring the Link Management Protocol (LMP) adjacency records to indicate that the nodes involved in the link are adjacent, if the adjacency information is not already in place. In addition step 166 may include performing control channel and data link configuration.

Steps 172-180 carried out for Node B correspond with steps 158-166 described above with reference to Node A. In the exemplary embodiment node A is the network node 14 and the node B is the network node 16.

Once both node A and/or node B have been installed and configured in steps 158-166 or steps 172-180 respectively, or it is determined that node A and/or node B is already installed, step 156-y or 170-y respectively, in step 184 the link configuration element 56 of the network management system (NMS) 26 can join the node records together in step 182 to create a physical link record in the network management system (NMS) records stored in the network management system (NMS) store 58 in the exemplary embodiment shown in FIG. 2.

Thereafter the node A and node B must be informed of the configuration in order for the link to become operational, as explained with reference to steps 186-190 of the exemplary embodiment shown in FIG. 5. These steps correspond with the sending of the link configuration information in step 82 of FIG. 3.

Thus in the exemplary embodiment described above with reference to FIG. 5, the adjacency configuration is sent to Node A and node B in step 186.

In step 188, the low priority control channel (CC) configuration is sent to node A and node B with in-band control channel (CC).

In step 190 the data link configuration information is sent to node A and node B with in-band control channel (CC), and the network management system operation ends in step 192.

In the exemplary embodiment shown in FIG. 2, the link configuration element (LCE) 56 in the network management system (NMS) 26 acts to configure the links between the nodes and is coupled to the LMP elements 64, 66 to communicate the link configuration to the LMP elements 64, 66. However, in different embodiments the functionality may be provided within the Network Management System (NMS) 26 as separate or as combined elements or distributed in a different fashion from that shown in FIG. 2 at the discretion of a skilled person. In some embodiments a LMP manager element may be provided separately from the link configuration element LCE 56 within the network management system (NMS).

The method as outlined above enables both the data-plane and the control plane basic topology to be built up automatically within the network in response to changes in the topology of the network, and without requiring any intervention from the operator. A full General Multi Protocol Label Switching (GMPLS) network control plane configuration can be achieved without manual operator procedures.

Thus, in summary, a method of configuring a link in a communication network has been described. Embodiments of the invention enable newly formed links to be detected and to be automatically configured by the network management system (NMS), without requiring intervention by the network operator.

The configuration information relating to a new link may be distributed to the network nodes in the exemplary embodiment using the link management protocol (LMP) of a General Multi Protocol Label Switching (GMPLS) communication network.

Embodiments of the invention provide a protocol implemented in the network nodes to notify a neighbor network node that a port has been connected. This may be achieved in some embodiments using the in-band Data Communication Channel (DCC) in a Synchronous Optical Network (SONET)/Synchronous Digital Hierarchy (SDH) communication network or General Communication channel (GCC) in an Optical Transport Network (OTN) that are configured during the commissioning phase of those communication networks.

Further embodiments of the invention provide a protocol implemented in the network nodes to notify the Network Management System (NMS) that a communication link has been formed between two network nodes and to give an indication of the connected ports of the respective network nodes. This may be achieved in some embodiments by using the Simple Network Management Protocol (SNMP) for example, or in other ways in different embodiments as seems suitable to a skilled person.

Further, a centralized Network Management System (NMS) procedure is provided to automatically upload network node data plane configuration information on the Network Management System (NMS) storage; to automatically create the representation of the physical data plane link on the Network Management System (NMS) storage; and to automatically configure General Multi Protocol Label Switching (GMPLS) Protocol Stack information for the newly formed communication link.

In embodiments of the invention, the General Multi Protocol Label Switching (GMPLS) Protocol Stack information that is automatically configured may include: the network node loopback interface; the network node Router ID (typically set equal to the loopback interface); the basic RSVP-TE protocol configuration; the basic OSPF-TE protocol configuration; the Link Management Protocol (LMP) Adjacency; a Low Priority Control Channel; the Link Management Protocol (LMP) Data Link; and, optionally, a high priority in band Control Channel.

Thus it will be appreciated by a skilled person that embodiments of the invention will enable information regarding communication network topology to be imported into the Network Management System (NMS) for both data-plane and control plane information without manual intervention by the network operator.

In addition, embodiments of the invention will enable basic configuration of the Link Management Protocol (LMP) for a General Multi Protocol Label Switching (GMPLS) communication network without manual intervention by the network operator.

The ability to automatically detect changes in the topology of the network when new communication links are formed, and to automatically configure those newly formed communication links results in a reduction in the Capital Expenditure (CAPEX) of the network operator and also removes a significant source of error.

Thus embodiments of the invention provide a new method and apparatus for configuring a link in a communication network.

The invention claimed is:

1. A method in a network node for automatically configuring a link in a General Multi Protocol Label Switching (GMPLS) communication network, comprising:

determining, at the network node, a formation of a communication link between the network node and another network node, wherein the determining comprises:
  detecting, by the network node, an initiation of the communication link at a first port of the network node;
  determining, by the network node, that the network node is to assume an active role in the formation of the communication link while the another network node is to assume a passive role based on determining that no link initiation message has been received by the network node over the communication link within a hysteresis period of time;
  sending, over the initiated communication link, a link initiation message including a unique identifier of the network node and an identifier of the first port; and
  receiving, over the initiated communication link, an acknowledgement message including a unique identifier of the another network node and an identifier of a second port of the another network node;
sending, due to the network node having assumed the active role, a link formation information to a link manager in response to the determination of the formation of the communication link while the another network node does not send the link formation information to the link manager, wherein the link formation information comprises the unique identifier of the network node, the identifier of the first port, the unique identifier of the another network node, and the identifier of the second port;
receiving link configuration information for the communication link from the link manager; and
configuring the communication link in response to the received link configuration information to make the communication link operational in the GMPLS communication network.

2. The method of claim 1, wherein determining the formation of the communication link between the network node and another network node further comprises detecting an insertion of a cable at a port of the network node.

3. The method of claim 1, wherein the unique identifier of the network node comprises a unique identification information of the network node and the identifier of the first port comprises Shelf Card Port identity information.

4. The method of claim 1, wherein the configuring the communication link comprises configuring local link configuration records for the communication link in response to the received link configuration information.

5. A method in a link manager for automatically configuring a link in a General Multi Protocol Label Switching (GMPLS) communication network, comprising:
  receiving a link formation information relating to a new communication link from a network node but not from another network node due to the network node assuming an active role during a formation of the new communication link and the another network node assuming a passive role during the formation, wherein the network node assumed the active role based on a determination that no link initiation message was received by the network node over the new communication link for a period of time, wherein the new communication link is between the network node and the another network node, and wherein the link formation information comprises an identifier of the network node, an identifier of a first port utilized by the network node for the new communication link, an identifier of another network node, and an identifier of a second port utilized by the another network node for the new communication link;
  creating a link record for the new communication link in response to the reception of the link formation information from the network node;
  determining a configuration for the new communication link; and
  sending a link configuration information to both the network node and to the another network node to cause each recipient to configure the new communication link accordingly to make the new communication link operational in the GMPLS communication network.

6. The method of claim 5, further comprising:
  determining that either the network node or the another network node are not previously installed within records of the link manager; and
  installing a network node record for either the network node or the another network node that was not previously installed.

7. A method of configuring a link in a General Multi Protocol Label Switching (GMPLS) communication network, comprising:
  determining, at a network node, a formation of a communication link between the network node and another network node, wherein the determining includes receiving, from the another network node at a first port of the network node, a link initiation message including an identifier of the another network node and an identifier of a second port utilized by the another network node for the communication link, wherein the determining further includes determining that the network node is to assume an active role in the formation of the communication link while the another network node is to assume a passive role based on determining that the link initiation message was received by the network node from the another network node within a hysteresis period of time;
  sending, by the network node due to the network node having assumed the active role, a link formation information to a link manager in response to the determination of the formation of the communication link, wherein the link formation information comprises the identifier of the network node, the identifier of the first port, the identifier of the another network node, and the identifier of the second port;
  receiving, by a link manager, the link formation information relating to the communication link from the network node but not from the another network node;
  creating, by the link manager, a link record for the communication link in response to the link formation information received from the network node;
  determining, by the link manager, a configuration for the communication link;
  sending, by the link manager, a link configuration information the network node and to the another network node;
  receiving, by the network node and the another network node, the link configuration information for the communication link from the link manager; and
  configuring, by the network node and the another network node, the communication link in response to the received link configuration information to make the communication link operational in the GMPLS communication network.

8. An apparatus for a network node of a General Multi Protocol Label Switching (GMPLS) communication network, for automatically configuring a link in the GMPLS communication network, the apparatus comprising:

a link configuration circuit, arranged to communicate with corresponding link configuration circuits in other network nodes of the GMPLS communication network, and arranged to communicate with a network management system of the GMPLS communication network; and a store, coupled to the link configuration circuit, for storing configuration information;

wherein the link configuration circuit is operable:

to communicate with another link configuration circuit of another network node to determine a formation of a communication link between ports of the respective network nodes;

to determine during the formation of the communication link whether the network node is to act in an active role or in an inactive role based on a determination of whether any link formation message is received from the another network node over the communication link within a hysteresis period of time;

when the network node is to act in the active role, to communicate with the network management system to inform a link manager of the formation of the communication link and of an identifier of each of the respective network nodes and of an identifier of the ports of each of the respective network nodes forming the communication link;

to receive link configuration information from the network management system; and to configure information for the communication link in the store based upon the received link configuration information to make the communication link operational in the GMPLS communication network.

9. The apparatus of claim 8, wherein the link configuration circuit, to communicate with the another link configuration circuit, is operable to:

detect an initiation of the communication link at a first port of the network node;

send, over the initiated communication link, a link initiation message including an identifier of the network node and an identifier of the first port; and receive, over the initiated communication link, a message including an identifier of the another network node and an identifier of a second port of the another network node.

10. An apparatus for a network management system of a General Multi Protocol Label Switching (GMPLS) communication network, for automatically configuring a link in the GMPLS communication network, the apparatus comprising:

a link configuration circuit, arranged to communicate with link configuration circuits in network nodes of the GMPLS communication network; and a store, coupled to the link configuration circuit, for storing information relating to a communication link;

wherein the link configuration circuit is operable:

to receive a link formation information relating to a communication link between a network node and another network node from a link configuration circuit in the network node but not from the another network node due to the network node assuming an active role during a formation of the communication link and the another network node assuming a passive role during the formation, wherein the network node determined that the network node was to assume the active role based on a determination that no link initiation message was received by the network node over the communication link for a hysteresis period of time, and wherein the link formation information comprises an identifier of the network node, an identifier of a first port utilized by the network node for the communication link, an identifier of another network node, and an identifier of a second port utilized by the another network node for the communication link;

to create a link record for the communication link in response to the reception of the link formation information from the network node;

to determine a configuration for the communication link; and to send a link configuration information to the network node and to the another network node to cause each recipient to configure the communication link accordingly to make the communication link operational in the GMPLS communication network.

11. The apparatus of claim 9, wherein the link configuration circuit is further operable to:

determine that either the network node or the another network node is not previously installed within records of the network management system; and install a network node record for either the network node or the another network node that was not previously installed.

12. A General Multi Protocol Label Switching (GMPLS) communication network comprising:

a network management system comprising:

a first link configuration circuit, arranged to communicate with link configuration circuits in network nodes of the GMPLS communication network; and a first store, coupled to the first link configuration circuit, for storing information relating to communication links;

wherein the first link configuration circuit is operable:

to receive a link formation information relating to a communication link between a network node and another network node from a second link configuration circuit in the network node but not from a third link configuration circuit of the another network node due to the network node assuming an active role during a formation of the communication link and the another network node assuming a passive role during the formation, and wherein the link formation information comprises an identifier of the network node, an identifier of a first port utilized by the network node for the communication link, an identifier of another network node, and an identifier of a second port utilized by the another network node for the communication link;

to create a link record for the communication link in response to the reception of the link formation information from the network node;

to determine a configuration for the communication link; and to send a link configuration information to the network node and to the another network node to cause each recipient to configure the communication link accordingly to make the communication link operational in the GMPLS communication network; and the network node comprising:

the second link configuration circuit, arranged to communicate with link configuration circuits in network nodes of the GMPLS communication network; and a second store, coupled to the second link configuration circuit, for storing information relating to the communication links;

wherein the second link configuration circuit is operable:

to communicate with another link configuration circuit of the another network node to determine a formation of the communication link between the first port of the network node and the second port of the another network node;

to determine during the formation of the communication link whether the network node is to act in the active role or in the passive role based on a determination of whether any link formation message is received from the another network node within a hysteresis period of time;

when the network node is to act in the active role, to communicate with the first link configuration circuit of the network management system to inform the first link configuration circuit of the formation of the communication link and of the identifier of each of the respective network nodes and of the identifier of the ports of each of the respective network nodes forming the communication link;

to receive the link configuration information from the first link configuration circuit; and to configure information for the communication link in the second store based upon the received link configuration information to make the communication link operational in the GMPLS communication network.

13. The method of claim 1, wherein said sending of the link initiation message occurs responsive to said determination that the network node is to assume the active role.

14. The method of claim 13, wherein said determining that the network node is to assume the active role comprises:

waiting for the hysteresis period of time; and determining that no link initiation message has been received at the first port during the hysteresis period of time.

* * * * *